Dec. 14, 1937.  F. J. HINDERLITER  2,102,072
ROTARY TOOL JOINT
Filed July 15, 1935
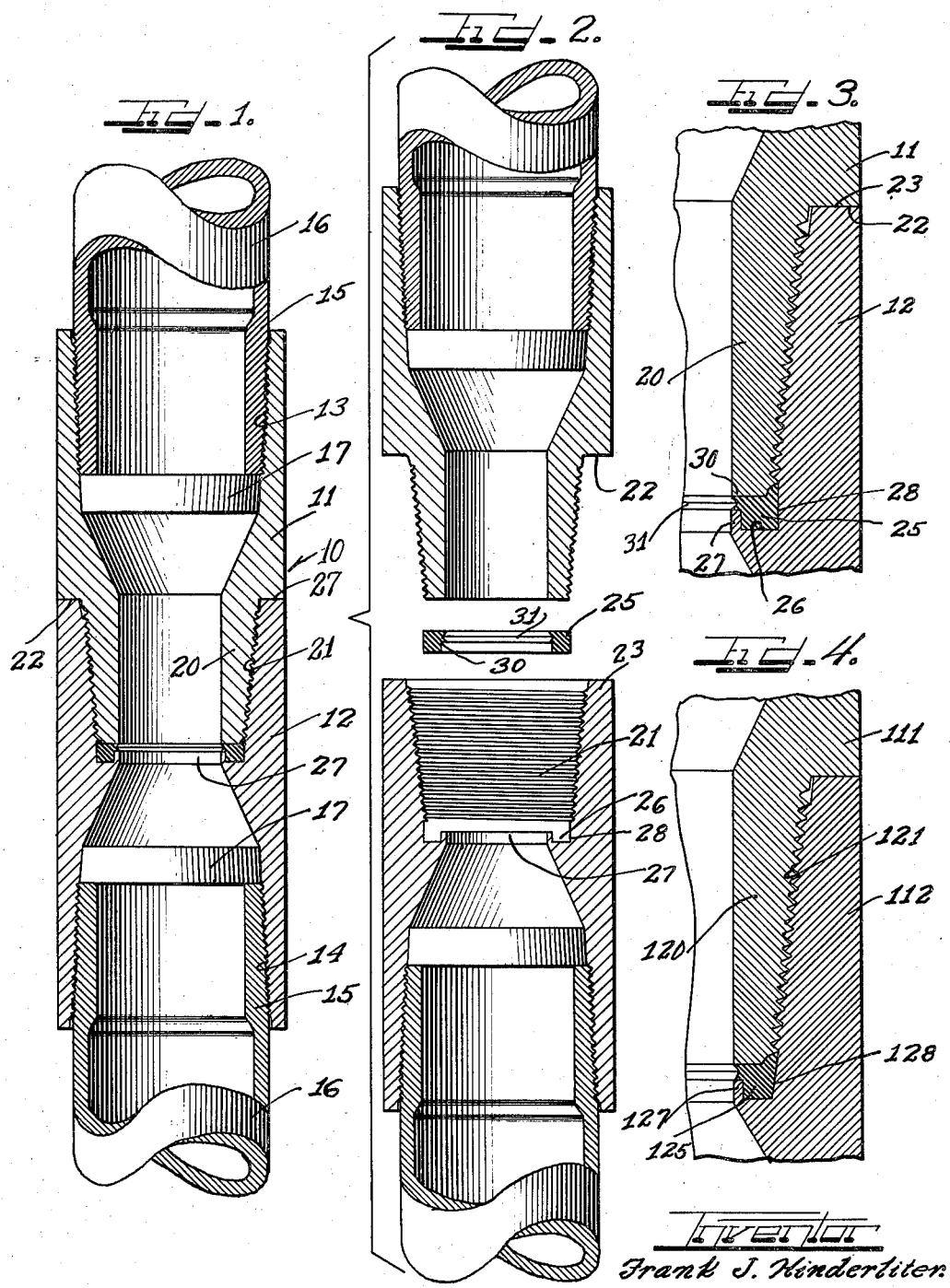

Patented Dec. 14, 1937

2,102,072

UNITED STATES PATENT OFFICE 2,102,072

ROTARY TOOL JOINT

Frank J. Hinderliter, Tulsa, Okla.

Application July 15, 1935, Serial No. 31,328

8 Claims. (Cl. 285—146)

This invention relates to a self-sealing rotary tool joint, and more particularly to a tool joint of the same general type as that disclosed in my issued patent Reissue 19,196, granted June 5, 1934.

An object of this invention is to provide a rotary tool joint with an improved sealing ring and supporting structure therefor.

Another object of this invention is to provide a tool joint having improved sealing means and improved means for confining the displacement of the sealing means by the inserting thrust of the pin member as it is screwed into the box member.

In accordance with the general features of this invention, there is provided a rotary tool joint including box and pin members and a rubber sealing ring for disposition in the bottom of the socket of the box member, which ring has its inner periphery provided with diverging annular lips adapted to be pressed away from each other by fluid flowing through the joint into sealing engagement with the inner end of the pin member and the bottom of the socket of the box member.

Another feature of the invention relates to the provision of an improved seat or supporting structure for the sealing ring which includes an annular rib connected to the bottom of the socket of the box member and spaced from the wall of the socket so as to define an annular groove in which the ring is adapted to be seated; the free end of this rib also cooperating with the bottom of the pin member to define a space through which an inner peripheral portion of the ring is adapted to extend so as to be exposed to the fluid under pressure flowing through the joint when the joint is in use.

Other objects and features of this invention will more fully appear from the following detailed description taken in connection with the accompanying drawing, which illustrates several embodiments thereof, and in which:

Figure 1 is a fragmentary sectional view taken through a rotary tool joint embodying the features of this invention, and illustrated as being applied to the upset ends of aligned drill pipes;

Figure 2 is a sectional view similar to Figure 1, but showing the pin and box members as being separated, with the rubber ring disposed therebetween;

Figure 3 is an enlarged fragmentary sectional view corresponding to a portion of Figure 1 and showing the manner in which the rubber ring is displaced by the inserting thrust of the pin into sealing engagement with the lower end of the pin and the bottom of the socket in the box member; and Figure 4 is a sectional view similar to Figure 3, but illustrating a modification of the invention in which the lower end of the socket has an annular groove defined on one side by a tapered wall aligned with the tapered threaded wall of the socket.

On the drawing:

The reference character 10 designates generally a rotary tool joint of the same general type as that disclosed in my aforesaid patent. This joint includes a pin member 11 and a box member 12. Each of these members has a tapered pipe socket 13—14 into which an upset threaded end 15 of a drill pipe 16 is adapted to be screwed.

Associated with the inner end of each of said upset ends 15 of the pipe is a rubber sealing ring 17 which embodies the features of my aforesaid patented invention.

The pin member 11 has a downwardly extending or depending tapered threaded shank 20 adapted to be screwed into a threaded tapered socket 21 in the box member 12. The movement of this end of the pin in the socket is limited by a shoulder 22 on the pin member coming into engagement with the shoulder 23 on the box member at the outer end of the socket 21.

Positioned between the inner end of the shank 20 and the bottom of the socket 21 is a rubber or resilient sealing ring 25 embodying the features of this invention. This ring is adapted to be disposed in an annular groove 26 formed in the bottom of the socket 21. This groove is defined on one side by an upstanding annular rib 27 formed integral with an intermediate interior section of the box member 12. The other side of this groove 26 is defined by a straight wall 28 formed at the lower end of the thread of the socket 21.

The rubber ring 25 has a larger cross-sectional area than that of the groove 26 so as to project upwardly beyond the groove. This upwardly projecting portion of the rubber ring 25 includes a lateral extension 30 adapted to project between the top of the rib 27 and the lower end of the shank 20, as is evident from Figures 2 and 3. Moreover, this extension 30 is provided at its inner periphery with a V-shaped notch or groove 31. This notch in effect provides the inner peripheral portion of the ring 25 with oppositely disposed diverging lips which are exposed to the pressure of the fluid flowing through the tool joint when the joint is in use. Obviously, this fluid pressure will force these lips in opposite directions, or in other words, into tight sealing engagement with the lower end of the shank 20 and the top of the rib 27. In this manner, the fluid under pressure is also utilized to aid in the maintenance of the seal between the bottom of the shank 20 and the socket 21.

In the assembly of the device, the rubber ring 25 is flexed or snapped into the bottom of the socket so that it is seated in the groove 26 between the rib 27 and the straight wall 28. Thereafter the shank 20 of the pin is threaded into the socket until its inserting thrust is applied to the top of the ring, whereby the ring is wedged or displaced into tight sealing engagement with both the lower end of the shank 20 and the side wall 28 in the bottom of the socket 21. The inward movement of the shank 20 in the socket 21 is limited by the shoulder 22 contacting the shoulder 23.

If there be any play between the box and pin members, or in other words, should the pin member tend to become loosened in the box member, the rubber ring, due to its being under compression, compensates for any such play and continues to maintain the fluid-tight seal. That is to say, the live rubber of the ring 25 causes said ring to at all times have a tendency to be urged into tight sealing engagement with the confining surfaces.

In Figure 4, I have illustrated a modification in which the pin member 111 has a threaded shank 120 adapted to be screwed into the threaded socket 121 of the box member 112. In the lower end of the socket there is disposed a rubber sealing ring 125, which, like the rubber ring 25, is confined on the seat by means of an annular rib 127 formed integral with the box member 112.

The only difference between this form of the invention and the form previously described resides in the wall 128, which is shown to be inclined or tapered, instead of straight as in the case of the wall 28. The tapered wall 128 is aligned with the threaded portion of the socket 121. The advantage of this tapered wall is that it enables the rubber ring to be wedged or crowded down an incline by the inserting thrust of the shank 120 of the pin member.

Now, I desire it understood that while I have illustrated and described in detail several forms of the invention, the invention is not to be thus limited, but only insofar as defined by the scope and spirit of the appended claims.

I claim as my invention:

1. A rotary tool joint including a box member having a threaded socket, a pin member having a threaded shank adapted to be screwed into said socket, and a sealing ring of resilient material disposed between the inner end of said shank and the bottom of said socket, said ring having its inner periphery provided with diverging annular lips which terminate in relatively sharp edges adapted to be pressed away from each other by fluid flowing through said joint into sealing engagement with the end of the shank and an edge portion of the bottom of said socket, said bottom of the socket having an integral upwardly projecting annular rib, the inner surface of which is aligned with the inner surface of the bore of the pin member, said resilient ring being disposed between said rib and a side wall of the socket on the bottom of the socket and projecting outside said rib, whereby said rib aids to confine the rubber against displacement from the bottom of the socket without interfering with the pressing of the sealing ring into tight sealing position by the inserting thrust of the shank as it is screwed into the socket.

2. A rotary tool joint including a box member having a threaded socket, a pin member having a threaded shank adapted to be screwed into said socket, both of said members having aligned bores through which fluid under pressure is adapted to flow when the joint is in use, and a rubber sealing ring in the bottom of said socket positioned in the path of the threaded shank so as to be subjected to the inserting thrust of the same, whereby the ring can be pressed into tight sealing engagement between the inner end of the shank and the bottom of the socket, said bottom of the socket being provided with an upstanding annular rib between which and the tapered wall of the socket the rubber ring is adapted to be disposed, said rib being in alignment with the bore in the pin member, and said rubber ring having a laterally extending peripheral portion adapted to project between the top of this rib and the bottom of said shank.

3. A rotary tool joint including a box member having a threaded socket, a pin member having a threaded shank adapted to be screwed into said socket, both of said members having aligned bores through which fluid under pressure is adapted to flow when the joint is in use, and a rubber sealing ring in the bottom of said socket positioned in the path of the threaded shank so as to be subjected to the inserting thrust of the same, whereby the ring can be pressed into tight sealing engagement between the inner end of the shank and the bottom of the socket, said bottom of the socket being provided with an upstanding annular rib between which and the tapered wall of the socket the rubber ring is adapted to be disposed, said rib being in alignment with the bore in the pin member, and said rubber ring having a laterally extending peripheral portion adapted to project between the top of this rib and the bottom of said shank, said portion having a V-shaped annular groove on its inner periphery so as to provide oppositely disposed lips adapted to be pressed by fluid under pressure into engagement with the top of said rib and the bottom of said shank.

4. A rotary tool joint including a box member, a pin member adapted to be threaded into the box member, and a sealing ring for disposition in the box member to establish a seal between the members, said sealing ring being disposed in the path of the pin member so that it can be subjected to the inserting thrust of the pin member as the pin member is screwed into the box member, whereby the ring is displaced into tight sealing cooperation with said members, one of said members having on the interior of the joint an annular rib spaced from the adjoining wall of the joint so as to define a seat for the rubber ring and so as to confine the displacement of the ring by the inserting thrust of the pin member, said ring having an inner lateral peripheral portion formed to extend between an end of said annular rib and the lower end of the pin member inside of the socket, which portion faces the interior of the joint so as to be subjected to the pressure of the fluid flowing therethrough when the joint is in use.

5. In a rotary pack-off tool joint the combination including pin and socket members, and a packing ring disposed between said pin and socket members, said packing ring having a cross-sectional configuration which includes a pair of inwardly extending diverging lips, and an axially extending depending flange.

6. In a rotary pack-off tool joint the combination including pin and socket members, and a packing ring disposed between said pin and socket members, said packing ring having a cross-sectional configuration which includes a pair of inwardly extending diverging lips, an axially extending depending flange on one side, and an axially oppositely extending flange on the other side.

7. In a rotary pack-off tool joint the combination including pin and socket members, and a packing ring disposed between said pin and socket members, said packing ring having a cross-sectional configuration which includes a pair of inwardly extending diverging lips, an axially extending depending flange on one side, and an axially oppositely extending flange on the other side, said second flange having a thickness dimension substantially smaller than that of said first flange.

8. In a rotary pack-off tool joint the combination including pin and socket members, and a packing ring disposed between said pin and socket members, said packing ring having a cross-sectional configuration which includes a pair of inwardly extending diverging lips which terminate in relatively sharp edges.

FRANK J. HINDERLITER.